United States Patent [19]

Hill et al.

[11] 4,202,128
[45] May 13, 1980

[54] ADJUSTABLE FLOAT SINKER

[76] Inventors: Robin E. T. Hill; Alan W. Mann; Ean L. McDonald; John L. Perdrix, all of 27 Gairlock St., Applecross, Western Australia, Australia

[21] Appl. No.: 882,160

[22] Filed: Feb. 28, 1978

[30] Foreign Application Priority Data

Mar. 4, 1977 [AU] Australia .............................. PC9288

[51] Int. Cl.$^2$ ............................................ A01K 93/00
[52] U.S. Cl. .................................................. 43/43.14
[58] Field of Search ............................ 43/43.14, 42.22

[56] References Cited

U.S. PATENT DOCUMENTS

| 2,519,427 | 8/1950 | Besmer | 43/43.14 |
| 3,012,359 | 12/1961 | Foster | 43/43.14 |
| 3,337,981 | 9/1967 | Bowman | 43/43.14 |
| 3,820,270 | 6/1974 | LaForce | 43/43.14 |

Primary Examiner—Nicholas P. Godici
Attorney, Agent, or Firm—Fleit & Jacobson

[57] ABSTRACT

An adjustable float-sinker comprising a body having a specific gravity of the order of that of water and means for varying the volume of the body without changing its mass.

2 Claims, 6 Drawing Figures

ADJUSTABLE FLOAT SINKER

This invention relates to an adjustable float-sinker which can be used in conjunction with fishing lines or with fishing nets or for other purposes.

The main object of the invention is to provide a suitable weight which can be attached to a fishing line and which can be readily adjusted to float on the top of the water, sink to the bottom rapidly or to sink slowly through intermediate positions.

Broadly the invention resides in an adjustable float-sinker comprising a body having a density of the order of that of water and means for varying the volume of the body without changing its mass.

Figure 1:
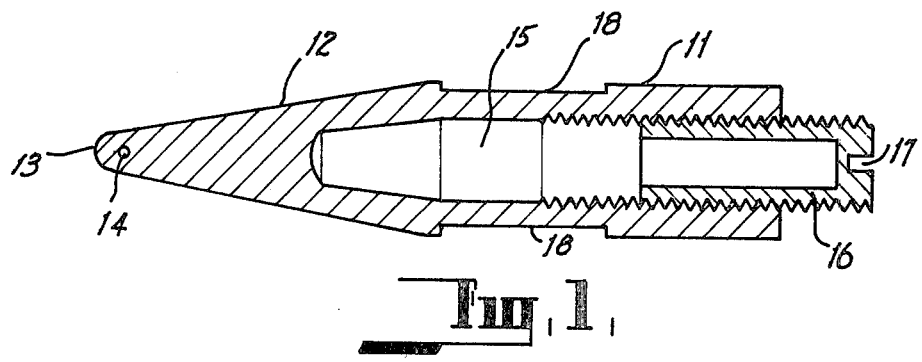
Figure 4:
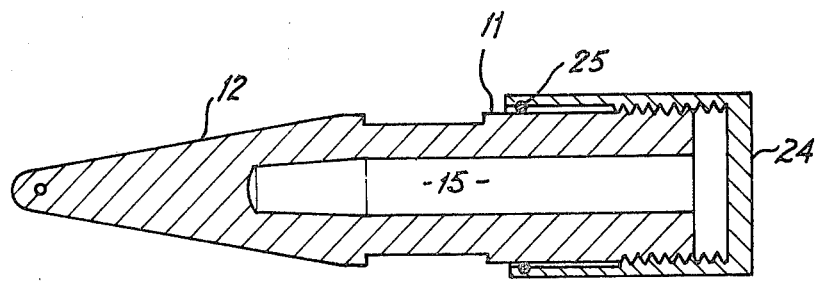
Figure 5:
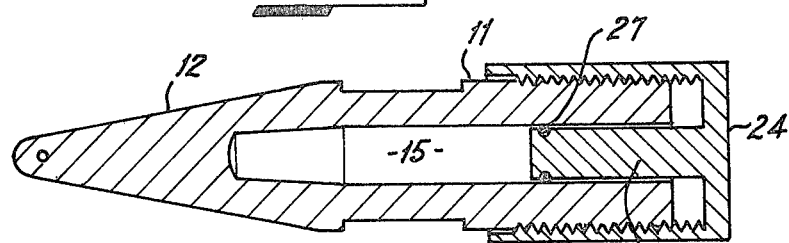
Figure 6:
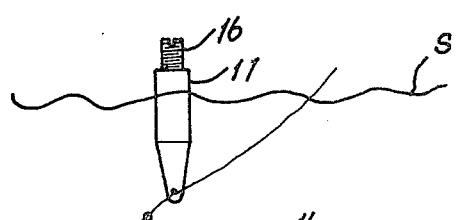
Figure 6:
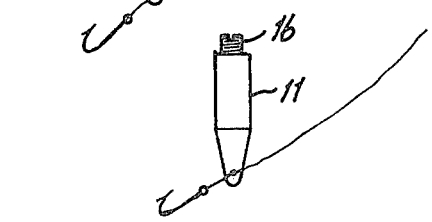
Figure 6:
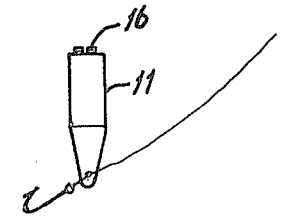

The invention will be better understood by reference to the following description of the specific embodiments of the invention shown in the accompanying drawings wherein:

FIG. 1 is a sectional elevation of a first embodiment;

FIGS. 2 to 5 inclusive are each sectional elevations of further embodiments of the invention; and FIG. 6 is a diagrammatic representation showing the use of the embodiment shown in FIG. 1.

In the embodiment shown in FIG. 1 the float-sinker is formed from a suitable plastic material such as cellulose acetate and comprises a cylindrical barrel 11 one end 12 of which tapers to a rounded point 13. A small hole 14 is provided adjacent to the rounded end to enable the float-sinker to be attached to a fishing line. The barrel is open at the other end and is provided with a cavity 15, the outer end of which is internally threaded to receive an externally threaded plug 16. The thread is designed to ensure that when the plug is in position, water cannot enter the cavity 15. The outer end of the plug is provided with a transverse slot 17 to receive a screw driver, knife blade, the edge of a coin or other suitable implement for adjusting the position of the plug by screwing it in or out of the cavity. A pair of diametrically opposed flats 18 are provided on the outside of the body to enable it to be held between the fingers whilst the position of the plug is being adjusted.

The overall dimensions of the body and plug, the density of the material used to form the body and plug, and the dimensions of the cavity, are selected so that the assembly has a specific gravity of the order of that of water. By screwing the plug in or out the volume of the float-sinker can be varied whilst the mass remains the same thus changing the specific gravity. When the plug is screwed out as shown in the top view of FIG. 6 the specific gravity is less than that of water and it will float at the surface indicated by the line S. When the plug is screwed in to an intermediate position it will sink slowly as indicated in the intermediate position in FIG. 6. By screwing the plug in further as indicated in the lower position in FIG. 6 it will sink at a more rapid rate to the bottom. The adjustment to the float-sinker may be done whilst observing the action in a bucket or tub of water or it may be done after one or more experimental casts at the commencement of fishing.

To ensure that the cavity remains free of water the thread may be greased with a suitable lubricant to ensure water tightness. In the alternative constructions shown in FIGS. 2 to 5 of the drawings, O-rings may be used to ensure a watertight fit. In the embodiment shown in FIG. 2 the outer portion 20 of the cavity is of increased diameter to accommodate a stepped portion 21 on the outer end of the plug, the stepped portion being provided with an O-ring seal 22. The embodiment shown in FIG. 3 is also similar to the embodiments shown in FIGS. 1 and 2, the inner end of the plug 16 being provided with an O-ring seal 23 which mates with the walls of the inner portion of the cavity 15.

Figure 2:
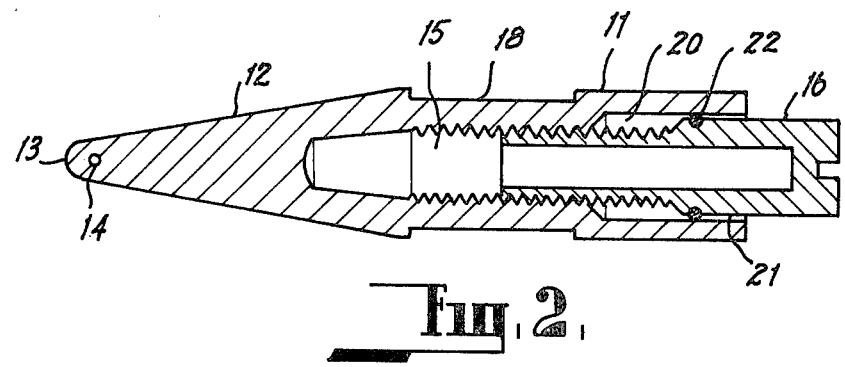
Figure 3:
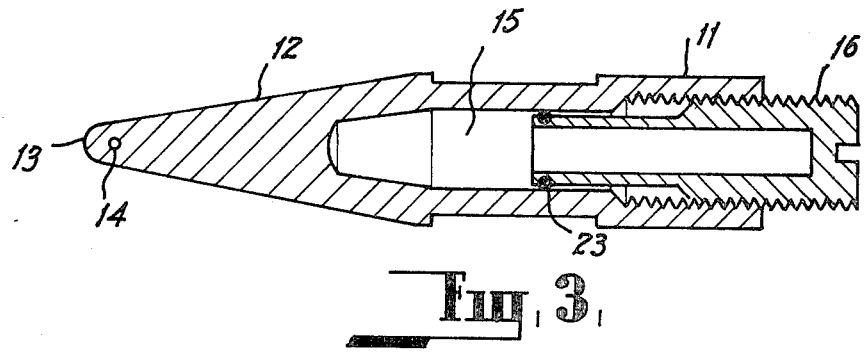

The embodiments of FIGS. 1 to 3 may have a gnurled or fluted grip on the outer end of the plug in place of the transverse slot to facilitate screwing the plug in or out.

In the embodiments shown in FIGS. 4 and 5, the plug is replaced by an internally threaded cap 24 which engages an external thread on the outside of the body 11. In the FIG. 4 embodiment an O-ring seal 25 is provided at the inner end of the cap.

In FIG. 5 embodiment the cap 24 is provided with an inwardly directed projection 26 which projects into the cavity 15 and the inner end of which is provided with an O-ring seal 27.

The cap of embodiments shown in FIGS. 4 and 5 may be slotted gnurled or fluted externally to facilitate screwing in or out.

Whilst the invention has been described with particular reference to several embodiments it is not limited thereto. The particular shape of the body may be varied as required. For example the body may be of more or less spherical shape or it could be shaped to resemble a fish.

The float-sinker of the present invention may be of sufficient weight to facilitate casting a fishing line. Being adjustable to be virtually weightless in water, it imparts little unnatural movement to the bait or lure as does a conventional float or sinker of similar weight, and it can be used in locations too rocky or weedy for fishing with a conventional sinker. A larger version of the float-sinker of the present invention could be used to replace conventional floats used on fishing nets. It would be a simple matter to adjust the operative position of the net by adjusting the float characteristics of the float-sinker by moving the plug or cap in or out as the case may be. The invention may also be used to monitor characteristics such as water current and sediment movement in hydrographic or oceanographic surveys, since the specific gravity can be adjusted to a value above, below or similar to that of the water by moving the plug in or out as the case may be. By suitable modification to size, weight and shape, and by calibration of the plug, the float-sinker of the present invention could be used to indicate or monitor the specific gravity of water and other liquids.

We claim:

1. An adjustable fishing float-sinker assembly comprising a substantially cylindrical body having a solid first end tapered to a rounded apex, said first end including means for connecting said body to a fishing line, said means for connecting comprising only a single opening in said first end, and a second end defining an opening, wherein said body defines a cavity open at its second end; a closure member free of any connection with a fishing line; means for threadingly connecting said closure member to said body for enclosing said cavity in a substantially water-tight manner wherein said body and closure member have a substantially cylindrical shape, in combination, and wherein said body and closure member are made of a plastic material; an o-ring seal positioned between said body and closure member for maintaining said cavity substantially water-tight; means for adjusting the position of said closure member with respect to said body between a first position, wherein said body and closure member displace a first volume, a second position, wherein said body and closure member displace a second volume, said second volume being less than said first volume, and intermediate positions between said first and second positions, wherein said body and closure member displace intermediate volumes; said body and closure member having a size, and made of a material having a density, such that the body and closure member have a specific gravity substantially equal to the specific gravity of water, and such that when said body and closure member is in said first position, the float-sinker assembly has a specific gravity less than that of the water in which it is to be used, when said body and closure member is in said second position, the float-sinker assembly has a specific gravity greater than that of the water in which it is to be used, and when said body and closure member is in a selected intermediate position, the float-sinker assembly has a specific gravity substantially equal to that of the water in which it is to be used.

2. An adjustable float-sinker assembly as claimed in claim 1 wherein said body and closure member are made of cellulose acetate.

* * * * *